United States Patent

Braisted et al.

[11] Patent Number: 5,808,581
[45] Date of Patent: Sep. 15, 1998

[54] FAULT DETECTION AND EXCLUSION METHOD FOR NAVIGATION SATELLITE RECEIVERS

[75] Inventors: Paul E. Braisted, San Jose, Calif.; Martin Beckmann, Austin, Tex.

[73] Assignee: Trimble Navigation Limited, Sunnyvale, Calif.

[21] Appl. No.: 568,832

[22] Filed: Dec. 7, 1995

[51] Int. Cl.[6] .............................. H04B 7/185; G01S 5/02
[52] U.S. Cl. ........................................... 342/357; 701/213
[58] Field of Search ........................ 342/357; 364/449.7; 701/213

[56] References Cited

U.S. PATENT DOCUMENTS

| | | | |
|---|---|---|---|
| 5,390,124 | 2/1995 | Kyrtsos | 342/357 |
| 5,436,632 | 7/1995 | Sheynblat | 342/357 |
| 5,490,073 | 2/1996 | Kyrtsos | 342/357 |

*Primary Examiner*—Theodore M. Blum
*Attorney, Agent, or Firm*—Thomas E. Schatzel; Law Offices of Thomas E. Schatzel A Prof. Corporation

[57] ABSTRACT

In a GPS navigation satellite receiver, a pseudorange step detection method integrates the pseudorange rates to predict expected changes in the pseudoranges from one measurement to the next. The pseudorange rate is directly measured as the carrier Doppler shift. The pseudorange and pseudorange rate from a last measurement from each satellite and a pseudorange rate from a new measurement are used to estimate the expected pseudorange. Such estimate accounts for vehicle velocity and accelerations. The expected pseudorange is compared to a newly measured pseudorange. An impermissible pseudorange step is declared when the difference exceeds a variable threshold. Tests can be done on measurements taken up to ten seconds apart, e.g., using a threshold of five hundred meters. The maximum position dilution of precision is typically set at a value of twelve. Satellites that manifest a pseudorange step are thereafter excluded from participating in subsequent position solution activity.

13 Claims, 4 Drawing Sheets

FAULT DETECTION AND EXCLUSION METHOD FOR NAVIGATION SATELLITE RECEIVERS

BACKGROUND OF THE INVENTION

1. Field of the Invention

The invention relates generally to navigation equipment and more specifically to Global Positioning System receivers and methods for detecting that a particular satellite has provided a faulty measurement and then excluding the faulty measurement from further position solution activity.

2. Description of the Prior Art

The Global Positioning System (GPS) is part of a satellite-based navigation system developed by the United States Defense Department under its NAVSTAR satellite program. A fully operational GPS includes twenty-four satellites approximately uniformly dispersed around six circular orbits with four satellites in each orbit. The orbits are inclined at an angle of 55° relative to the equator, and are separated from each other by multiples of 60° longitude. The orbits have radii of 26,560 kilometers and are approximately circular. The orbits are non-geo-synchronous, with 0.5 sidereal day (11.967 hours) orbital periods, so that the satellites move with time relative to the earth below.

Three or more GPS satellites should be visible from most points on the earth's surface, and access to three or more such satellites can be used to determine an observer's position anywhere near the earth's surface, twenty-four hours per day. Each satellite carries atomic clocks to provide timing information for the signals transmitted by the satellites. Internal clock correction is provided for each satellite clock.

Four satellites, at a minimum, are needed to uniquely determine three dimensions of position and time. If only three satellites are visible, conventional GPS software solves for latitude, longitude and time. Time is nearly always needed to be ascertained, and the altitude dimension can be constrained, e.g., assumed or provided.

Each GPS satellite transmits two spread spectrum, L-band carrier signals. An "L1" signal has a frequency f1=1575.42 MHz, and an "L2" signal has a frequency f2=1227.6 MHz. These two frequencies are integral multiples f1=(1540)(f0) and f2=(1200)(f0) of a base frequency f0=1.023 MHz. The L1 signal from each satellite is binary phase shift key (BPSK) modulated by two pseudo-random noise (PRN) codes in phase quadrature, and carries a coarse grained acquisition code (C/A-code) and a precision, fine-grained code (P-code). The L2 signal from each satellite is BPSK modulated by only the P-code.

The use of two carrier signals L1 and L2 permits the computation for partial compensation of the propagation delays of the signals through the ionosphere. This ionospheric delay varies approximately as the inverse square of signal frequency f (delay proportional to $f^{-2}$). This phenomenon is discussed by MacDoran in U.S. Pat. No. 4,463,357.

Use of the PRN codes in a code multiple access scheme allows the sorting out of the GPS satellite signals that all share the same L1 and L2 frequencies. A signal transmitted by a particular GPS satellite is selected by generating and matching, or correlating, the corresponding, unique PRN code for that particular satellite. The PRN codes come from a short list, and each is stored in GPS receivers carried by ground observers.

The P-code is a relatively long, fine-grained code having an associated clock or chip rate of (10)(f0)=10.23 MHz. The C/A-code allows rapid satellite signal acquisition and handover to the P-code and is a relatively short, coarser grained code having a clock or chip rate of f0=1.023 MHz. The C/A-code for any GPS satellite has a length of 1023 chips and thus repeats every millisecond. The full P-code has a length of 259 days, with each satellite transmitting a unique portion of the full P-code. The portion of P-code used for a given GPS satellite has a length of precisely one week (7.000 days) before this code portion repeats. Acceptable methods for generating the C/A-code and P-code are set forth in the GPS interface control document ICD-GPS-200, published by Rockwell International Corporation, Satellite Systems Division, Revision B, 30 Nov. 1987.

The GPS system is such that the C/A-code and P-code can be deliberately corrupted by random dithering that reduces position-fix accuracy. This mode is called Selective Availability (SA). A mode called Anti-Spoofing (AS) includes the transmission of an encrypted Y-code in place of the P-code. "Authorized" receivers can decode the Y-code and such receivers can retain their accuracy in position fix determination during SA.

The GPS satellite bit stream includes navigational information on the ephemeris of the transmitting GPS satellite and an almanac for all GPS satellites, with additional parameters providing corrections for ionospheric signal propagation delays suitable for single frequency receivers and for an offset time between satellite clock time and true GPS time. The navigational information is transmitted at a rate of fifty baud. A useful discussion of the GPS and techniques for obtaining position information from the satellite signals is found in *Guide To GPS Positioning*, edited by David Wells, Canadian GPS Associates, 1986.

A second configuration for global positioning is the Global Navigation Satellite System (GLONASS), placed in orbit by the former Soviet Union and now maintained by the Russian Federation. GLONASS also uses twenty-four satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete seventeen and sixteen revolutions, respectively, around the earth every eight days. The GLONASS system uses two carrier signals "L1" and "L2" with frequencies of f1= (1602+9 k/16) MHz and f2=(1246+7 k/16) MHz, where k=(0, 1, 2, . . . , 24) is the channel or satellite number. These frequencies lie in two bands at 1.597–1.617 GHz (L1) and 1.240–1.260 GHz (L2). The L1 signal is modulated by a C/A-code (chip rate=0.511 MHz) and by a P-code (chip rate=5.11 MHz). The L2 signal is presently modulated only by the P-code. The GLONASS satellites also transmit navigational data at a rate of fifty baud. Because the channel frequencies are distinguishable from each other, the P-code is the same, and the C/A-code is the same, for each satellite. The methods for receiving and analyzing the GLONASS signals are similar to the methods used for the GPS signals.

Single frequency (L1 only) and dual-frequency (L1 and L2) GPS receivers are now commercially available that are unauthorized and therefore unable to decode the encrypted Y-code. Dual frequency GPS receivers are capable of receiving more than just the L2 carrier transmissions from GPS satellites. A single frequency GPS receiver system could be associated with L2 transmitters that would cause little, if any, interference on the L1 frequency. Since much or all of the hardware already exists in portable GPS receivers to receive position reports over an otherwise under-used L2 carrier frequency, only software changes to the programming of a conventional GPS receiver may be needed to implement a ground network that has its members' individual positions communicated amongst them.

The use of GPS equipment may soon supplant older navigation systems such as LORAN, Omega, and inertial guidance. The maintainers of such systems have begun planning their phase-out and increased use of GPS to provide the primary means of navigation for commercial and general aviation. In order for GPS-based systems to fill the role of the primary navigation system, the systems themselves must have the ability to run simple tests on the information that each satellite in a constellation is providing. Satellites that provide erratic measurements need to be identified as soon as they become erratic, and thereafter excluded from contributing to position solutions.

Pseudorange step errors can affect the reliability and integrity of a GPS receiver. Pseudorange is the measurement taken by a GPS receiver of each satellite signal from which user position can be computed. Pseudorange errors can result in position and velocity solution errors. Conventional mechanisms designed to detect ramp errors may not be able to detect step errors. Particular kinds of GPS receiver position solution finding can result in a pseudorange step error escaping detection. Kalman filters commonly used in GPS receivers can mask the high positional acceleration and jerk that a pseudorange step error erroneously indicates. Better techniques used in certain GPS receivers do not mask such things. GPS receivers in critical missions need to detect steps, as well as offsets, ramps, parabolic, random walk, or any other trajectory that would cause a position error.

Pseudorange steps may appear simply because there are too few satellites or a poor satellite geometry. In any event, false pseudorange step alarms should not occur when it is the actual vehicle motion and dynamics that are responsible for the step. For example, at six hundred knots a legitimate pseudorange step of about 308.67 meters occurs between one second measurements from a satellite that is directly ahead of or behind an aircraft. The length of permissible steps must be increased directly with the period between measurements, for example, to accommodate a loss of lock or to permit sequencing in a GPS receiver with less than six channels.

Although Kalman filter state propagation techniques can be used to reduce false step detection due to vehicle motion and dynamics, such techniques are vulnerable to satellite geometry. Kalman filters are also limited in their ability to follow and model vehicle dynamics. Therefore, Kalman filters cannot be used to solve such problems.

SUMMARY OF THE PRESENT INVENTION

It is therefore an object of the present invention to provide an exceptionally reliable GPS-receiver that can detect and exclude satellites that produce pseudorange step errors.

It is another object of the present invention to provide a method for detecting pseudorange step errors.

Briefly, a pseudorange step detection method of the present invention integrates the pseudorange rate to determine an expected change in the pseudorange from one measurement to the next. The pseudorange rate is directly measured as the carrier Doppler shift. The pseudorange and pseudorange rate from a last measurement from each satellite and a pseudorange rate from a new measurement are used to estimate the expected pseudorange. Such estimate accounts for vehicle velocity and accelerations. The expected pseudorange is compared to a newly measured pseudorange. An impermissible pseudorange step is declared when the difference exceeds a variable threshold. Tests can be done on measurements taken up to ten seconds apart, e.g., using a threshold of five hundred meters, with maximum position dilution of precision typically set at a value of twelve. The Position Dilution of Precision (PDOP) is a measure of the satellite geometry. PDOP can be used to estimate the position error resulting from a given pseudorange error. Satellites that manifest a pseudorange step are thereafter excluded from participating in subsequent position solution activity.

An advantage of the present invention is that a GPS receiver is provided that is reliable in the presence of one or more faulty satellites.

Another advantage of the present invention is that a method is provided for the detection of pseudorange step errors. This detection can be done even when a full position solution cannot be done, due to insufficient satellites or poor geometry.

These and other objects and advantages of the present invention will no doubt become obvious to those of ordinary skill in the art after having read the following detailed description of the preferred embodiment that is illustrated in the drawing figures.

IN THE DRAWINGS

DETAILED DESCRIPTION OF THE PREFERRED EMBODIMENT

Figure 1:
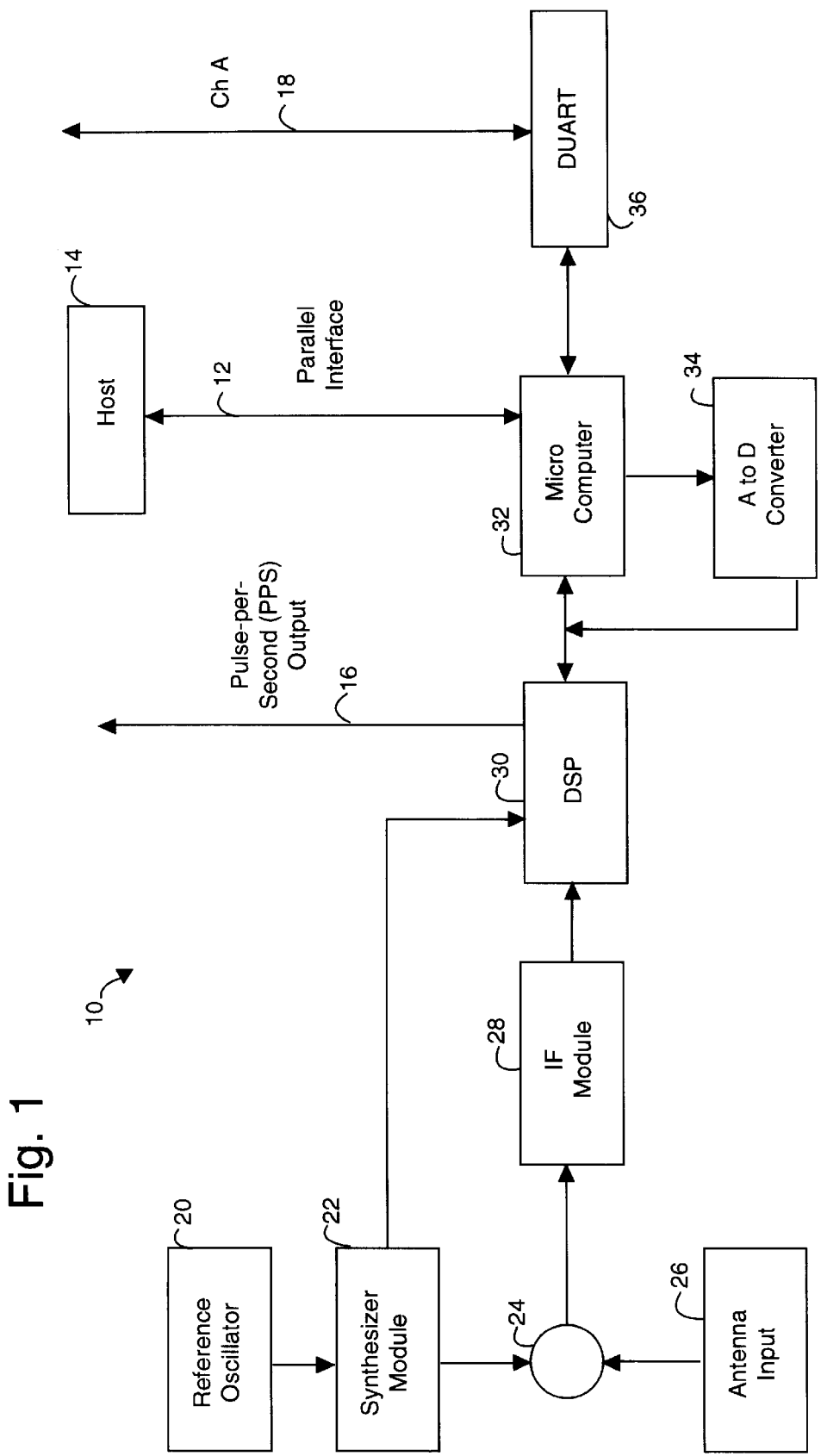
FIG. 1 is a block diagram of a GPS receiver embodiment of the present invention.

FIG. 1 illustrates a nine-channel GPS receiver embodiment of the present invention, referred to herein by the general reference numeral 10. GPS receiver 10 includes hardware and software needed for satellite signal processing and position/velocity solution computations. The GPS receiver 10 has nine processing channels operating on the L1 frequency using the C/A code. The GPS receiver 10 provides a bi-directional parallel bus interface 12 to a host 14, a one-microsecond-duration pulse-per-second (PPS) output 16 and a serial channel 18. The GPS receiver 10 includes a reference oscillator 20, a frequency synthesizer module 22, a mixer 24, an antenna input 26 to receive signals from orbiting satellites, an intermediate frequency (IF) module 28 for downconversion, a digital signal processing (DSP) chip 30 that decodes and demodulates nine channels of satellite signals, a microcomputer 32 that computes position and velocity from the decoded and demodulated signals, an analog-to-digital converter (ADC) 34, and a dual-universal asynchronous receiver transmitter (DUART) 36.

The GPS receiver 10 receives satellite signals through the antenna input 26 that are filtered and fed to the mixer 24 and are downconverted and fed to the IF module 28. A local oscillator signal for the mixer 24 is provided by the synthesizer module 22 that gets its master timing reference from a 16.368 MHz temperature compensated crystal oscillator, reference oscillator 20. The synthesizer module 22 also produces several frequencies used by the DSP module 30 and the microcomputer 32. The IF module processes the IF signal, amplifying it and limiting its bandwidth. The resulting signal is fed to the DSP 30.

The DSP 30 includes hardware for tracking nine channels of GPS signals and for extracting carrier and code information, and a fifty bits per second data subcarrier. The microcomputer 32 controls the operation of the tracking hardware in the DSP 30. Measurements and data are collected to compute position and velocity solutions in the microcomputer 32. The selection of what satellites will be tracked is controlled and the orbital information data and almanac for all of the satellites is managed by microcomputer 32.

The ADC 34 allows the GPS receiver 10 to monitor the status of a primary power supply, the synthesizer module 22, a back-up battery, an antenna power supply feed, and an internal temperature. The GPS receiver 10 communicates with the host 14 over the parallel bus 12, and it may also communicate with external devices with the DUART 36 on the bi-directional serial data port 18.

The DSP 30 not only comprises hardware for tracking the GPS signals and extracting carrier and code information, it also provides a millisecond timing interrupt. Software is used to control the operation of the tracking hardware in the DSP 30. In turn, the DSP 30 provides GPS signal information to the microcomputer 32.

The pulse-per-second (PPS) output 16 is controlled by the DSP 30. A one microsecond pulse generated each second is controlled by a twelve-bit programmable delay, specified in 1.023 MHz clock cycles. Software is used to determine a bias from GPS system time during a position solution. The PPS delay is stored prior to the $999^{th}$ millisecond of a GPS second. The GPS receiver 10 software also sets the PPS output flag during processing of the $998^{th}$ millisecond of each GPS second, and clears it for all other millisecond periods. During normal navigation, the onset of the PPS will be within two microseconds of the so-called "UTC" second.

The primary function of the GPS receiver 10 is to provide accurate navigation data, e.g., position and velocity, to a host processor of a navigation system. The software is written in C and Motorola 68340 assembly languages, and runs on a Motorola 68340 microcomputer.

Figure 2:
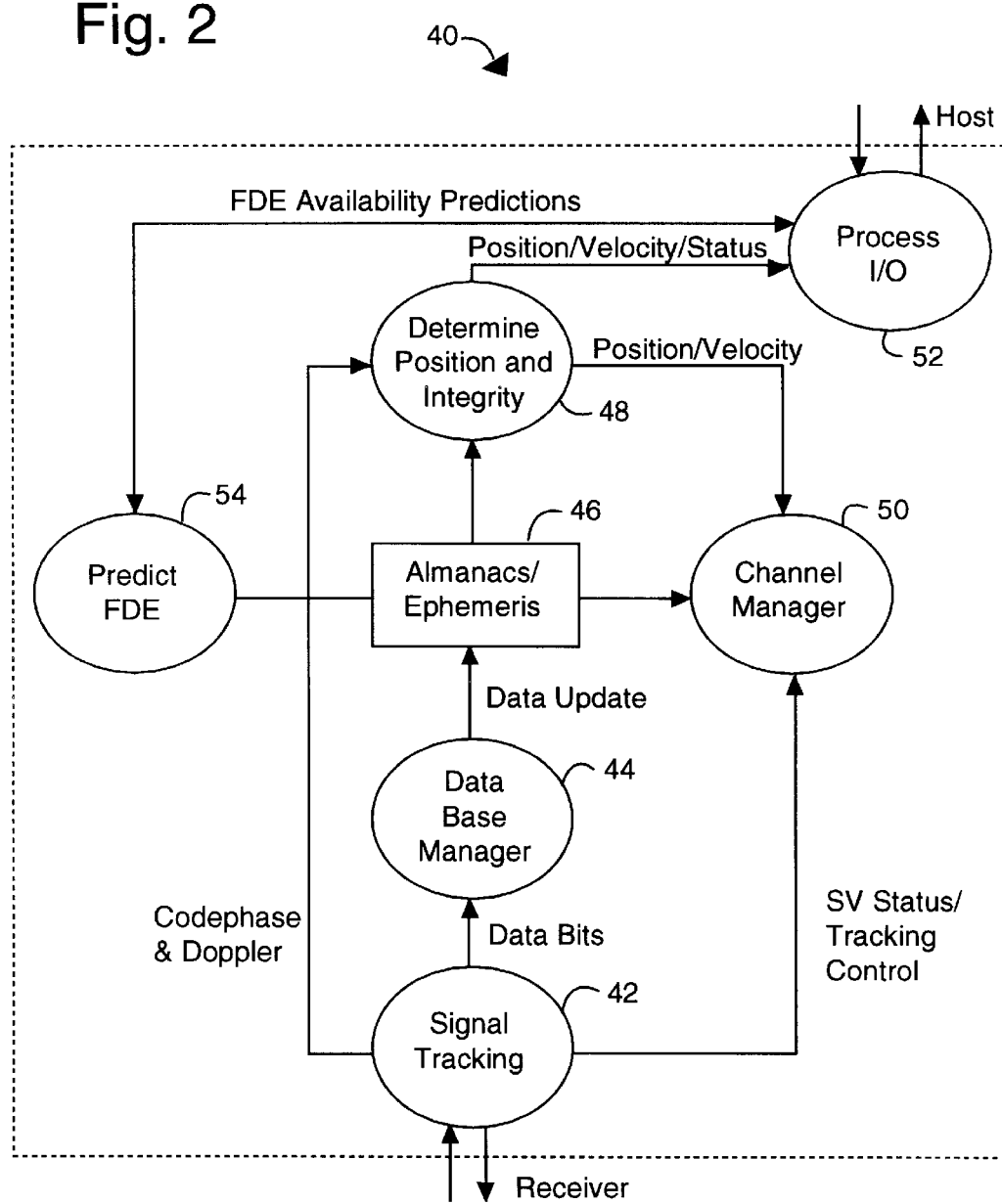
FIG. 2 is a data flow diagram of the GPS receiver of FIG. 1.

FIG. 2 represents a program data flow 40 within the microcomputer 32. Satellite acquisition and signal tracking are done by processing incoming raw GPS signals in the DSP 30 for information to send to navigation routines that produce position and velocity estimates. Such solutions are then sent to the host 14. At least four satellites above a minimum acceptable elevation and above a minimum receivable signal-to-noise ratio with a position dilution of precision (PDOP) of 12.0 or less are needed by a signal tracking function 42. Data from this function is then provided to a database manager 44. Data updates are then made available for an almanac/ephemeris 46. The almanac/ephemeris, code phase, and Doppler shift readings are provided to a task 48 that estimates the position, velocity, and solution integrity. Solution integrity is checked by Fault Detection and Exclusion (FDE), and by a pseudorange step detector to detect pseudorange steps that exceed a threshold and to exclude the involved satellite from participating in solution activity, at least for a minimum period. Position and velocity estimates and satellite Space Vehicle (SV) tracking and control information are provided to a channel manager 50. An input/output (I/O) process 52 receives position, velocity, and status from the task 48 and manages an interface with the host 14. An FDE prediction task 54 uses the almanac and ephemeris and data from the I/O process 52 to compute the expected availability of navigation and FDE.

In a typical configuration, all the GPS satellites transmit normal navigation data, indicate healthy status and predicted user pseudorange accuracy (URA) of better than sixty-four meters. The error from reference oscillator 20 does not exceed five parts per million. The velocity of the vehicle does not exceed 400 meters/second (about 800 knots), and the acceleration of the vehicle does not exceed 19.6 meters-per-second-per-second. The rate of change of the vehicle acceleration does not exceed 19.6 meters-per-second-per-second-per second.

During each satellite selection process, the GPS receiver 10 determines whether the current set of selected satellites and altitude is sufficient to provide integrity monitoring. If such integrity monitoring can be provided, the integrity check is done on each position fix, and the result of this check is reported. If an integrity failure is detected, the GPS receiver 10 attempts to determine which satellite failed and then excludes it from further position solution use, e.g., for ten minutes. On receipt of a Fault Detection and Exclusion (FDE) prediction request from the host 14, the GPS receiver 10 predicts the availability of fault detection or FDE at various points and times elected by the host 14. Under typical operating conditions, the GPS receiver 10 provides position, velocity and position integrity updates and reports at least once every second, on average.

The microcomputer 32 includes a battery-backed read-write Random Access Memory (RAM) for the navigation data base 44. The last known position, satellite almanacs, satellite ephemeris data, GPS satellite constellation health codes, and system operating parameters are stored in the RAM. An elevation angle mask is maintained to set the minimum acceptable elevation of any satellite to be used in the solution. A signal strength mask is used to set the minimum received signal strength. A Position Dilution of Precision (PDOP) mask is used that prevents the calculation of a navigation solution when the satellite geometry is such that the PDOP exceeds a specified value, e.g., twelve. A mode switch mask is used to force the system to switch from three-dimensional to two-dimensional mode if the available satellite constellation has a PDOP, for three-dimension navigation, greater than the specified value. The system will then use the three satellites that afford the lowest PDOP while using the available altitude. The mode selection specifies whether the GPS satellite selection is to be done in manual two-dimension, manual three-dimension, or auto mode.

During initialization, the GPS receiver 10 uses the information pre-existing in the data base 44. Once a satellite is acquired and healthy, and the previous data base information for that satellite is more than five minutes old, fresh satellite ephemeris data is collected before it is used for position and velocity solutions.

Figure 3:
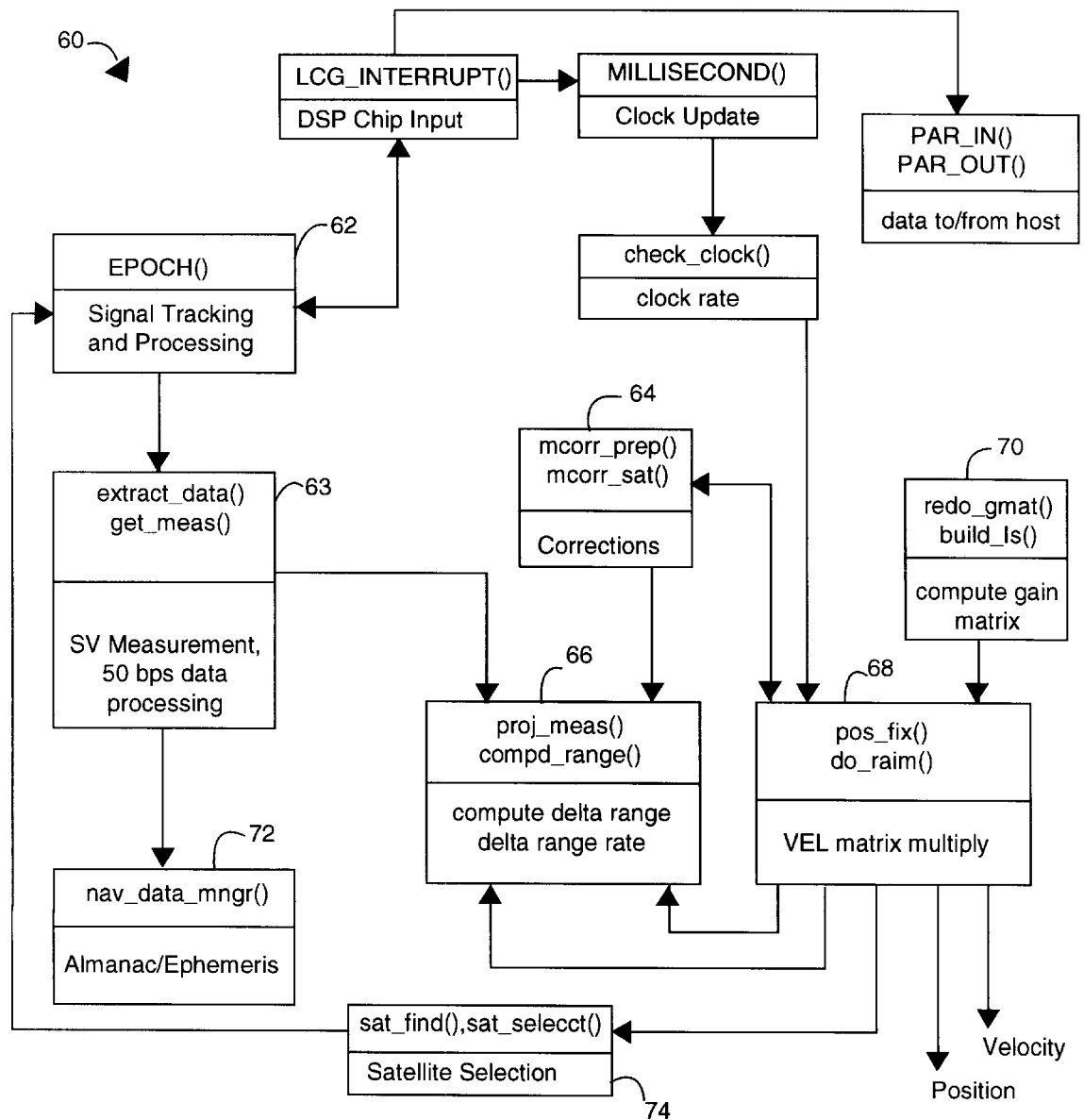
FIG. 3 is a flow chart diagram of the position determination computer program used by the GPS receiver of FIG. 1.

FIG. 3 represents the control flow of a position determination process 60. The DSP 30, under control of an (EPOCHO) subroutine 62, tracks GPS signals and extracts carrier and code information in a process (extract_data(), get_meas()) 63. It also provides a one millisecond (millisecond()) timing interrupt for the microcomputer 32. The values of C/A code delay and measurement time (related to pseudorange), carrier Doppler shift (related to relative velocity), and data edge delay from each satellite in use are corrected for deterministic effects in a subroutine (mcorr_prep(), mcorr_sat()) 64. Pseudorange (PR) and pseudorange rate (PRR) residuals are then estimated by finding the difference between previous estimates and the corrected measurements in a subroutine (proj_meas(), compd_range()) 66. These residuals are multiplied by gain matrices to solve for delta position and velocity, plus oscillator bias and bias rate. These, in turn, are used to determine latitude, longitude, GPS time equivalent to the updated position, altitude (if in three-dimensional mode), and velocity in a subroutine (pos_fix()) 68. If the position change from the last position solution exceeds ten kilometers then, the gain matrices, computed from user and satellite direction cosines, are recomposed in a subroutine (redo_gmat()) 70. The position bias and velocity bias rate outputs of pos_fix() 68 are then applied to the next position update. Satellites used for position determination are reassessed periodically, e.g., at least once a minute, or when commanded. Almanac and ephemeris (fifty bit-per-second) data collected from the available satellites are stored in the battery-backed RAM by a navigation data manager subroutine (nav_data_mngr()) 72, and used in a satellite selection process (sat_find(), sat_select()) 74. The host may also deselect satellites via commands sent to the CPS receiver 10.

When the position stored in memory is not a GPS-calculated position, e.g., a user-entered estimate, or when sufficient time has passed since the last fix such that the GPS receiver 10 could have moved more than one hundred fifty kilometers, the GPS receiver 10 may invoke a special "anywhere fix" process that allows a search for satellites "below" the specified elevation mask, using Doppler shift values significantly different from those predicted for the stored position. Whenever the stored position is completely erroneous, such a search process can stretch the time to first fix to fifteen minutes or more. During this "anywhere fix" process, the position output is not flagged as valid.

Figure 4:
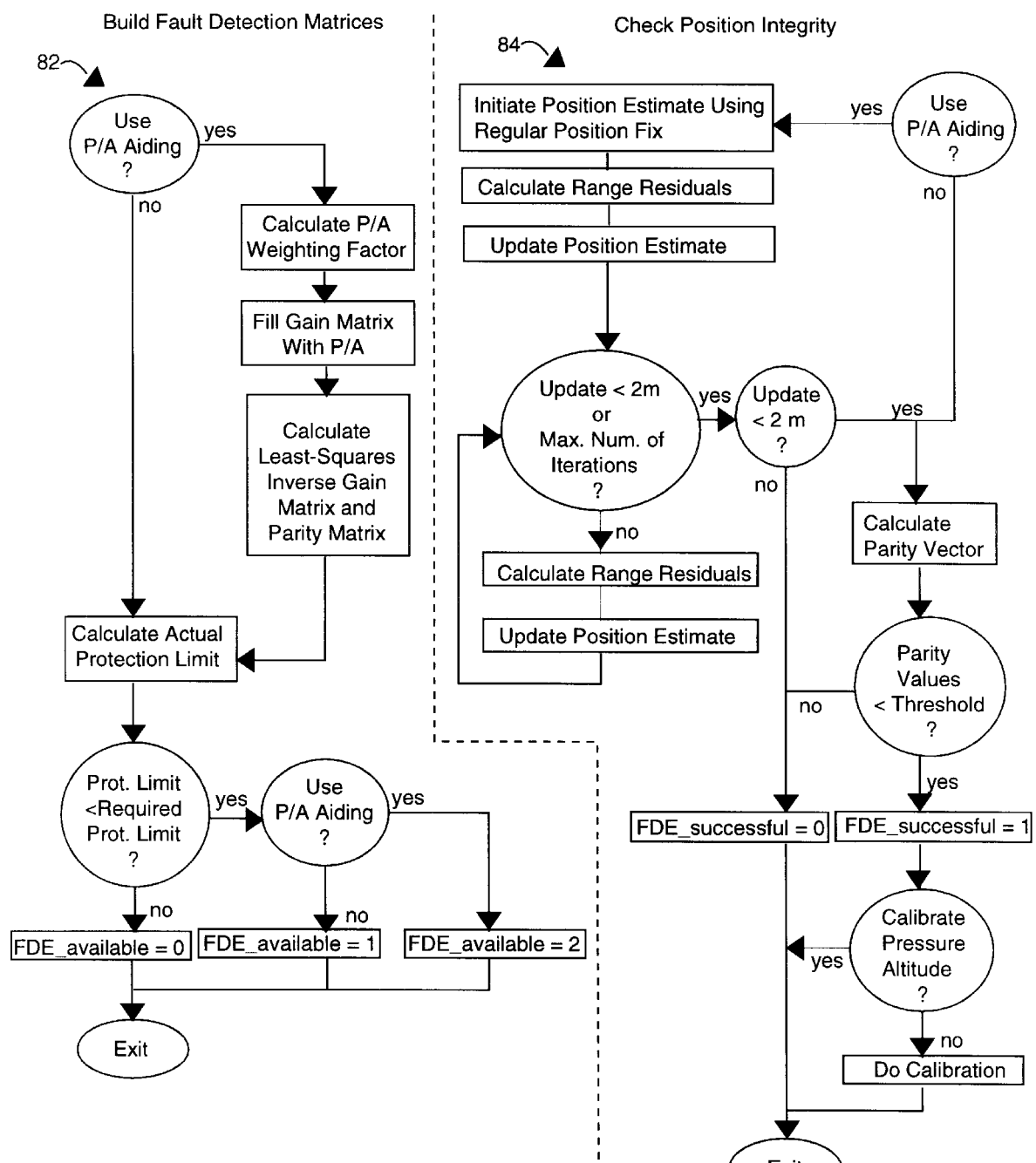
FIG. 4 is a flowchart diagram of the fault detection computer program used by the GPS receiver included in FIG. 1.

FIG. 4 illustrates a Fault Detection and Exclusion (FDE) process 80 that is called from the main control loop of the microcomputer 32. The fault detection depends on a parity vector scheme to determine the integrity of the position fixes previously calculated. In this parity vector scheme, the number of elements of the parity vector is equal to the number of measurements used for FDE. Each element of the parity vector represents the pseudorange error status of a corresponding satellite. The FDE process 80 has two parts, a fault detection matrices building process 82, and a position integrity checking process 84. After the set of satellites has been selected, the capability of the current satellite constellation to provide fault detection is checked. For fault detection to be available, two conditions must be satisfied. First, at least five satellites must be available, or four satellites if a recently calibrated altitude measurement is in hand. Second, the satellite constellation and the calibrated altitude measurement must enable the detection of position errors larger than that of a required protection limit. The detection probability of such errors is preferably 99.9 percent or better and the false alarm rate is preferably one false alarm per 500 hours or better. The process 82 is executed once after the satellite selection process 74. Providing that fault detection is available, after each position fix is calculated, the integrity of the position fix is checked. If the fault detection process 84 does not use a calibrated altitude measurement and the integrity of the current position fix is good, then the current altitude is calibrated using that position fix. If an integrity check fails, the process 84 attempts to find a subset of satellites for which FDE is available and that does not generate an FDE integrity warning. This is done by successively excluding satellites from the set of satellites selected, starting with the satellite with the largest absolute value in its corresponding element of the parity vector. If such a set is found, the excluded satellite can be selected again after ten minutes.

A pseudorange step error detection test is done on each new measurement by comparing the expected pseudorange computed using the average pseudorange rate from the last and current measurements of carrier Doppler shift, to propagate the previous code based pseudorange. If the difference based on consecutive samples taken not more than ten seconds apart is greater than five hundred meters, an impermissible pseudorange step is declared and further measurements from that satellite are not used in the position computations for ten minutes.

The GPS receiver 10 software initialization occurs immediately after the microcomputer 32 is reset. A reset can also occur as a result of a host command. The initialization includes power-up built-in-test (BIT), RAM clearing, peripheral device initialization, and data base initialization. During initialization, tests of the hardware and firmware verify normal operational capability. Failure of any test is cause to flag the error and continue if possible, such errors are reported to the host 14. RAM memory is cleared during software initialization, so that any RAM location not later written can be presumed to be zero. The microcomputer 32 configures the peripheral devices and verifies the presence of the DSP 30 by verifying a clock setting. If the tests fail, an error flag is set. Flag words within the battery-backed RAM memory are tested at power-up. If they contain the expected values, the memory is presumed to contain navigation data base elements that were previously saved. If not, the data base is cleared.

Except during an "anywhere fix" process, the software maintains a list of satellites to be acquired and their acquisition status. A satellite is placed on the acquisition queue for signal tracking if its almanac information exists, it is flying above the minimum elevation mask, and it indicates as being healthy, e.g., as reported in the almanac data and summary data pages.

Satellites already on the acquisition queue that no longer meet the criteria above are removed from the queue. The GPS receiver 10 tracks the nine highest-elevation satellites on the acquisition queue. A set of satellites to be used in position and velocity computations is selected. The satellites that are currently being tracked, (1) must not have been deselected by the host 14, (2) must not have been excluded by the FDE or pseudorange step error detection functions, (3) the ephemeris data (SV orbit and clock) must be less than four minutes old and indicate that the satellite is healthy, (4) the signal level must be above the mask, (5) the predicted URA must be less than sixty-four meters, and (6) the URA alert flag must not be set.

If the PDOP for these satellites is less than the PDOP and mode switch masks, then the GPS receiver 10 software can use these satellites for three-dimension navigation. If the PDOP for these satellites exceeds either the PDOP or the mode switch mask, or only three satellites are available, the satellite selection software identifies the three satellites that provide the best geometry for two-dimension navigation. If the PDOP for these satellites is less than the PDOP mask, the GPS receiver 10 software selects these three satellites for two-dimension navigation.

When the system transitions from three-dimension to two-dimension, it uses the last calculated GPS altitude. It then replaces this with a host-supplied altitude when such altitude is received from the host 14.

If the best three-satellite PDOP exceeds the PDOP mask, the GPS receiver 10 discontinues position fixing and indicates this condition to the host 14. If three-dimension navigation is selected and the "anywhere fix" process is not on, the GPS receiver 10 evaluates the availability of fault detection adequate for a current flight mode, as specified by the host 14, e.g., four nautical miles over the ocean, two nautical miles enroute, and one nautical mile near the airline terminal. If five or more satellites are selected, fault detection availability is based upon all selected satellite measurements. If this check fails, or if there are only four selected satellites, then fault detection availability is based upon all selected satellites measurements and automatic pressure or a barometer corrected altitude input (pressure altitude "P/A") from the host 14, unless the host 14 indicates that the altitude source is a manual entry. The GPS receiver 10 indicates to the host 14 the availability status of fault detection.

If fault detection is available, and the protection limit provides the integrity necessary for the current phase of flight, the GPS receiver 10 reports to the host 14 that fault detection status. If fault detection is available or the protection limit is less than ten kilometers, the GPS receiver 10 computes all data required to perform the integrity test on subsequent position solutions.

The satellite acquisition process reassesses the satellites at least once every three minutes. The satellite selection process repeats at least every minute, and as required by changes in the list of available satellites. The list of available satellites is arranged in numerical order by satellite number.

Valid satellite almanac or ephemeris data are combined with accurate position, time, and velocity estimates to produce predictions of satellite visibility and Doppler shift. These data are used to maintain satellite visibility and Doppler predictions current to within ten minutes of real time. The software also computes deterministic corrections (ionospheric, tropospheric, earth rotation) for each usable satellite (healthy satellite for which ephemeris data is available), current to within ten minutes of real time.

Satellite navigation data refers to a fifty bit-per-second signal transmitted by each orbiting satellite. The GPS receiver 10 software obtains satellite navigation data from each acquired satellite to maintain the current almanacs for all satellites, the current ephemeris data for the acquired satellites, and GPS time information. The navigation process receives values of C/A code delay and measurement time (related to pseudorange), Doppler shift (related to relative velocity), and data edge delay from each satellite in use, together with a previous position estimate and optional altitude input from the host 14, and puts out updated estimates of receiver position, velocity, and position integrity. It obtains current GPS time information from the GPS data frames and measurement time for each signal measurement, and determines the GPS time equivalent to the updated position.

Alternatively, a built-in-test (BIT) is included in the microcomputer 32 to routinely test the GPS receiver 10 hardware and firmware during the start-up process and on a background basis. Failures are flagged to the host 14, but such failures do not necessarily prevent continued operation. A power-up system status test checks the read only and RAM memory, interrupts, ADC 34, DSP 30, etc. The status of a feedline between an antenna assembly and the microcomputer 32 is monitored by a circuit that can detect both short-circuit and open-circuit conditions. For example, if the feedline voltage is between 3.0 and 4.98 volts, inclusive, and the feedline current is between 0.02 and 0.11 amperes, inclusive, the feedline is deemed to be working properly. Otherwise, it is considered to have failed. The GPS receiver 10 reports such status to the host 14. The status of the synthesizer control voltage is also monitored. If the voltage is between 1.5 and 3.5 volts, inclusive, and two consecutive readings differ by no more than about 0.1 volts, the synthesizer is deemed to be working properly. otherwise, it is considered to have failed. Other tests are also made on the epoch/millisecond alignment to accumulated commands from the DSP 30 to detect failure of a chip to execute slew commands. An error flag is set when the clock bias rate exceeds a threshold of about 6.3 Parts Per Million (PPM), and clears the flag when the rate is below the threshold. The GPS receiver 10 can continue to operate under this error condition. However, acquisition time is degraded when the clock is too far off the nominal frequency.

Although the present invention has been described in terms of the presently preferred embodiment, it is to be understood that the disclosure is not to be interpreted as limiting. Various alterations and modifications will no doubt become apparent to those skilled in the art after laving read the above disclosure. Accordingly, it is intended that the appended claims be interpreted as covering all alterations and modifications as fall within the true spirit and scope of the invention.

What is claimed is:

1. A method for pseudorange step detection in a navigation satellite receiver comprising the steps of:

collecting new pseudorange measurements from a plurality of orbiting satellites;

comparing a new pseudorange measurement to an expected pseudorange propagated from a previous code-based pseudorange with an average pseudorange rate obtained from a current and a last carrier Doppler measurement; and if a difference based on consecutive samples taken not more than ten seconds apart is greater than a threshold distance, an impermissible pseudorange step is declared and further measurements from a particular corresponding satellite are not used in the position computations for about ten minutes.

2. The method of claim 1, further comprising the steps of:

doing an initial integrity check on each of a plurality of position fixes derived from said pseudorange measurements;

whenever an initial integrity check fails, using the navigation satellite receiver in an attempt to find a subset of satellites for which Fault Detection and Exclusion (FDE) is possible without generating an integrity warning;

returning of candidate satellites to a list of available satellites previously excluded by a FDE process;

successively excluding satellites one at a time from said list of available satellites, and rechecking the integrity of each satellite subset produced; and if a set of satellites is found that passes an integrity check, the excluded satellite remains excluded for a period of time and then is returned to said list of available satellites if it also passes a tracking and availability requirement.

3. The method of claim 2, wherein:

pseudorange measurements for all selected satellites are compared to expected pseudoranges to said orbiting satellites from a user position to determine if a position error is larger than a protection limit.

4. The method of claim 3, further comprising the step of:

reporting the results of any fault detection to a host processor connected to the navigation satellite receiver.

5. The method of claim 2, further comprising the step of:

calculating the difference between an automatic barometric pressure altitude input and an altitude purely obtained from pseudorange measurements from a minimum number of said orbiting satellites.

6. The method of claim 2, further comprising the step of:

correcting a constraint altitude if fault detection is not possible using pseudorange measurements from said orbiting satellites only, thereafter using said altitude for fault detection, weighted with a weighting factor.

7. A navigation satellite receiver with pseudorange step detection, comprising:

a downconverter and demodulator for collecting new pseudorange measurements from a plurality of orbiting satellites;

a microcomputer connected to the downconverter and demodulator for comparing a new pseudorange measurement to an expected pseudorange propagated from a previous code-based pseudorange with an average pseudorange rate obtained from a current and a last carrier Doppler measurement; and threshold detector connected to the microcomputer for declaring an impermissible pseudorange step if a difference based on consecutive samples taken not more than a period apart is greater than a threshold distance.

8. A navigation satellite receiver with pseudorange step detection, comprising:

a detector providing for checking each measurement from a satellite for a pseudorange step error;

a filter providing for excluding said satellite from use in a position solution activity for a period of time if a pseudorange step error is detected; and a threshold detector providing for comparing a navigation measurement for each satellite-in-use to an expected value of pseudorange and pseudorange rate from an assumed vehicle position at a measurement time, wherein a difference between a measured and a predicted value is used to update a position estimate and a velocity estimate.

9. A navigation satellite receiver with position solution integrity checking, comprising:

a detector providing for finding a subset of orbiting navigation satellites for which fault detection and exclusion (FDE) is possible without generating an integrity warning whenever an initial integrity check fails;

a first list manager providing for returning of a set of candidate satellites to a list of available satellites previously excluded by a FDE process;

a second list manager providing for successively excluding each of said candidate satellites one at a time from said list of available satellites, and rechecking the integrity of each satellite subset produced; and a third list manager providing for keeping an excluded satellite excluded if a set of satellites is found that passes an integrity check for a period of ten minutes and for returning said excluded satellite to said list of available satellites if a tracking and availability requirement is satisfied.

10. The receiver of claim 9, wherein:

the detector further provides for pseudorange measurements for all selected satellites to be compared to expected pseudoranges to the satellites from a user position to determine if a position error is larger than a protection limit.

11. The receiver of claim 10, further comprising:

an alarm providing for reporting the results of any fault detection to a host processor connected to the navigation satellite receiver.

12. The receiver of claim 9, further comprising:

a calculator for finding a difference between an automatic barometric pressure altitude input and an altitude purely obtained from a set of pseudorange measurements from a minimum number of satellites.

13. The receiver of claim 9, further comprising:

a processor for correcting a constraint altitude if a fault detection is not possible using pseudorange measurements from orbiting satellites only, and for thereafter using said constraint altitude for fault detection including a weighting factor.

* * * * *